(12) United States Patent
García Capel et al.

(10) Patent No.: US 12,254,607 B2
(45) Date of Patent: Mar. 18, 2025

(54) IMAGE PROCESSING METHOD AND APPARATUS IMPLEMENTING THE SAME

(71) Applicant: OMNIVISION TECHNOLOGIES, INC., Santa Clara, CA (US)

(72) Inventors: Luis Eduardo García Capel, Singapore (SG); Bo Mu, San Jose, CA (US)

(73) Assignee: OMNIVISION TECHNOLOGIES, INC., Santa Clara, CA (US)

(*) Notice: Subject to any disclaimer, the term of this patent is extended or adjusted under 35 U.S.C. 154(b) by 358 days.

(21) Appl. No.: 17/576,302

(22) Filed: Jan. 14, 2022

(65) Prior Publication Data

US 2023/0230212 A1 Jul. 20, 2023

(51) Int. Cl.
*G06K 9/00* (2022.01)
*G06T 5/00* (2006.01)
*G06T 5/50* (2006.01)
*G06T 5/92* (2024.01)
*G06T 7/33* (2017.01)

(52) U.S. Cl.
CPC .............. *G06T 5/92* (2024.01); *G06T 5/00* (2013.01); *G06T 5/50* (2013.01); *G06T 7/337* (2017.01); *G06T 2207/20016* (2013.01); *G06T 2207/20208* (2013.01); *G06T 2207/20221* (2013.01)

(58) Field of Classification Search
CPC ........................................ G06T 2207/20201
See application file for complete search history.

(56) References Cited

U.S. PATENT DOCUMENTS

| | | | | |
|---|---|---|---|---|
| 11,665,427 B2* | 5/2023 | Hubel | ........................ | G06T 5/50 |
| | | | | 382/254 |
| 2009/0278857 A1* | 11/2009 | Wajs | ......................... | G06T 5/50 |
| | | | | 345/629 |
| 2015/0103222 A1* | 4/2015 | Choi | .................... | H04N 23/6812 |
| | | | | 348/333.05 |
| 2017/0163892 A1* | 6/2017 | Mihic | ........................ | G06T 5/50 |

(Continued)

OTHER PUBLICATIONS

Davide Scaramuzza, "Tutorial on event cameras"; Institute of Informatics—Institute of Neuroinformatics, 2020, pp. 1-113.

(Continued)

*Primary Examiner* — Hadi Akhavannik
(74) *Attorney, Agent, or Firm* — MUNCY, GEISSLER, OLDS & LOWE, P.C.

(57) ABSTRACT

An image processing method and a device configured to implement the same are disclosed. The method comprises: obtaining optical input from a hybrid imaging device, wherein an obtained optical input comprises a first component and a second component that temporally corresponds to the first component; wherein the first component of the obtained optical input corresponds to a first temporal resolution, while the second component of the obtained optical input corresponds to a second temporal resolution higher than that of the first component; performing image restoration operation on a first subset of the first component of the obtained optical input in accordance with data from the second component of the obtained optical input; and performing image fusion operation to generate fused image data from an output of the image restoration operation and a second subset of the first component of the obtained optical input.

24 Claims, 11 Drawing Sheets

(56) References Cited

U.S. PATENT DOCUMENTS

| | | | |
|---|---|---|---|
| 2019/0139205 A1* | 5/2019 | El-Khamy | G06V 30/2504 |
| 2020/0045227 A1* | 2/2020 | Jiang | H04N 25/133 |
| 2020/0249017 A1* | 8/2020 | Török | H04N 7/188 |
| 2021/0090222 A1* | 3/2021 | Lee | G06T 1/20 |
| 2021/0174092 A1* | 6/2021 | Zhao | G06T 7/254 |
| 2021/0195082 A1* | 6/2021 | Peng | H04N 23/45 |
| 2022/0198628 A1* | 6/2022 | Dinh | H04N 19/52 |

OTHER PUBLICATIONS

J. Han et al., "Neuromorphic Camera Guided High Dynamic Range Imaging," 2020 IEEE/CVF Conference on Computer Vision and Pattern Recognition (CVPR), 2020, pp. 1727-1736.

Chen, Guanying, et al. "HDR Video Reconstruction: A Coarse-to-fine Network and A Real-world Benchmark Dataset." arXiv preprint arXiv:2103.14943 (2021); pp. 1-10.

Lin, Songnan, et al. "Learning Event-Driven Video Deblurring and Interpolation." European Conference on Computer Vision. vol. 3. (2020); pp. 1-16.

Pan, L., Scheerlinck, C., Yu, X., Hartley, R., Liu, M., & Dai, Y. (2019). "Bringing a blurry frame alive at high frame-rate with an event camera," Proceedings of the IEEE/CVF Conference on Computer Vision and Pattern Recognition; pp. 6820-6829.

\* cited by examiner

IMAGE PROCESSING METHOD AND APPARATUS IMPLEMENTING THE SAME

BACKGROUND

1. Technical Field

The present disclosure generally relates to image processing method and device implementing the same, and pertains more specifically to an image processing implementation that utilizes a hybrid imaging device having dual sensing elements of distinct characteristics to achieve enhanced high dynamic range (HDR) processing.

2. Description of the Related Art

High Dynamic Range (HDR) imaging in conventional pipelines often consists of capturing optical images at different times with different exposure sensitivities. Nevertheless, conventional HDR pipelines often involve only a single type, intensity-frame based imaging component.

The limitations for such arrangements may become apparent when there involves motion induced image distortion caused by relative motions between the image capturing device and the object to be optically captured.

While the abovementioned shortcomings may be addressed by a number of processing techniques in an intensity-based HDR pipeline, the pursuit of higher immunity to image distortion at lower computational cost is desired.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
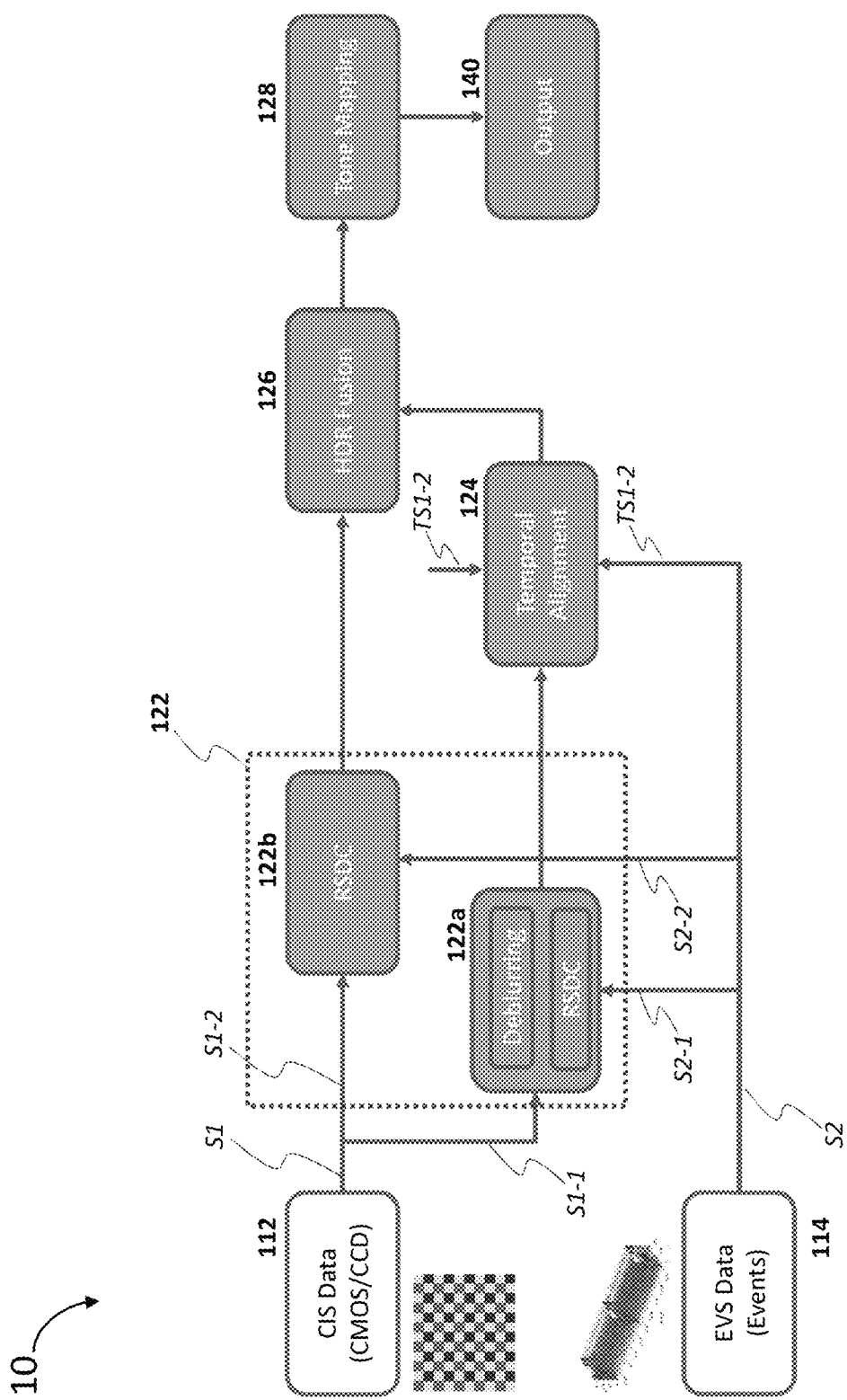
FIG. 1 shows an exemplary image processing implementation in accordance with some embodiments of the instant disclosure.

The present disclosure will now be described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these exemplary embodiments are provided so that this disclosure will be thorough and complete, and will fully convey the scope of the disclosure to those skilled in the art. Like reference numerals refer to like elements throughout.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The instant disclosure describes methods and devices configured to integrate both intensity-frame based image sensors (e.g., complementary metal oxide semiconductor image sensor/CIS or charge coupled device/CCD) and dynamic event-based sensor (dynamic/event vision sensor (DVS/EVS), a rather novel type of neuromorphic sensor) imagers to improve the accuracy of inter-frame synchronization, thereby enabling enhanced de-blurring, de-ghosting and rolling-shutter distortion correction (RSDC) performance in a multi-frame HDR imaging pipeline.

A variety of multi-exposure HDR capture techniques are currently available, among which may include sequential HDR, skimming HDR, staggered HDR, down-sampling HDR, and split-diode HDR, to name a few.

The skimming HDR scheme functions by asserting after a first duration (i.e., a long exposure time T1) a mid-level voltage pulse on a transfer gate while photon charge is being integrated, whose falling edge defines the start of a second exposure time (i.e., a short exposure time T2). The ratio between T1 and T2 (i.e., (T1+T2)/T2) defines a dynamic range (DR) extension. The staggered multi-frame HDR scheme functions by combining a long and a short integration time capture. The down-sampling multi-frame HDR scheme trades off pixel resolution for increased DR by combining neighboring pixels with different integration times. The split-diode HDR scheme is developed for automotive applications, where each sensor pixel is provided with a large photodiode and a small photodiode. The pair of photodiodes are configured to expose simultaneously, which gives this type of HDR scheme an inherent immunity to ghost artifacts caused by scene motion.

Nevertheless, the current HDR pipelines mainly involve a single type, intensity-frame based imaging component (e.g., CIS or CCD). For example, current HDR solutions in commercial products are primarily based on conventional image data, and often only incorporate 1) camera shake correction using feature matching or Inertial Measurement Unit (IMU) data, and 2) de-ghosting using optical flow, block matching, optimization techniques or deep learning.

The limitations for such arrangements may be apparent when there involves motion induced image distortion caused by relative motion between the image capturing device and the object to be optically captured (e.g., due to camera shaking or object motion, or both). Observed result of such unpleasant image distortion may include motion blur and ghosting artifacts (e.g., results of accuracy limitations in temporal alignments).

While the abovementioned shortcomings may be dealt with by a number of processing techniques/algorithms in an intensity-based HDR pipeline (e.g., depending on specific capturing techniques applied), the pursuit of higher immunity to image distortion often translates to higher cost of hardware specification, more power consumption, and/or longer processing time under the conventional HDR pipelines.

For one thing, in a conventional HDR pipeline, de-blurring operation for the long-exposure frames in multi-exposure techniques is usually not considered, despite that de-blurring may be necessary for correcting image distortion in fast moving object and/or camera motion to obtain a sharp image in a final result. For another, temporal alignment between multi-exposure frames is difficult to perform using sparse data alone because conventional intensity-based sensors have limited temporal resolution (e.g., frame rate). The limited temporal resolution particularly imposes limits on the performance of existing algorithms that try to estimate motion from sparse data. In addition, rolling-shutter distortion is usually not considered in existing algorithms, but may be a key consideration particularly when the image capturing mechanism/technique involves a combination of CMOS-based sensor and neuromorphic sensor data. Furthermore, existing deep learning end-to-end approaches to HDR are computationally expensive, especially when being adapted in an application where the integration between neuromorphic sensor data and conventional sensor data is called for.

FIG. 1 shows an image processing implementation in accordance with some embodiments of the instant disclosure. By way of example, the exemplary image processing implementation may be integrated in a multi-frame high dynamic range (HDR) imaging pipeline to provide enhanced immunity against motion induced image distortion problems such as motion blur, ghosting artifact, and rolling shutter distortion effects.

Figure 6:
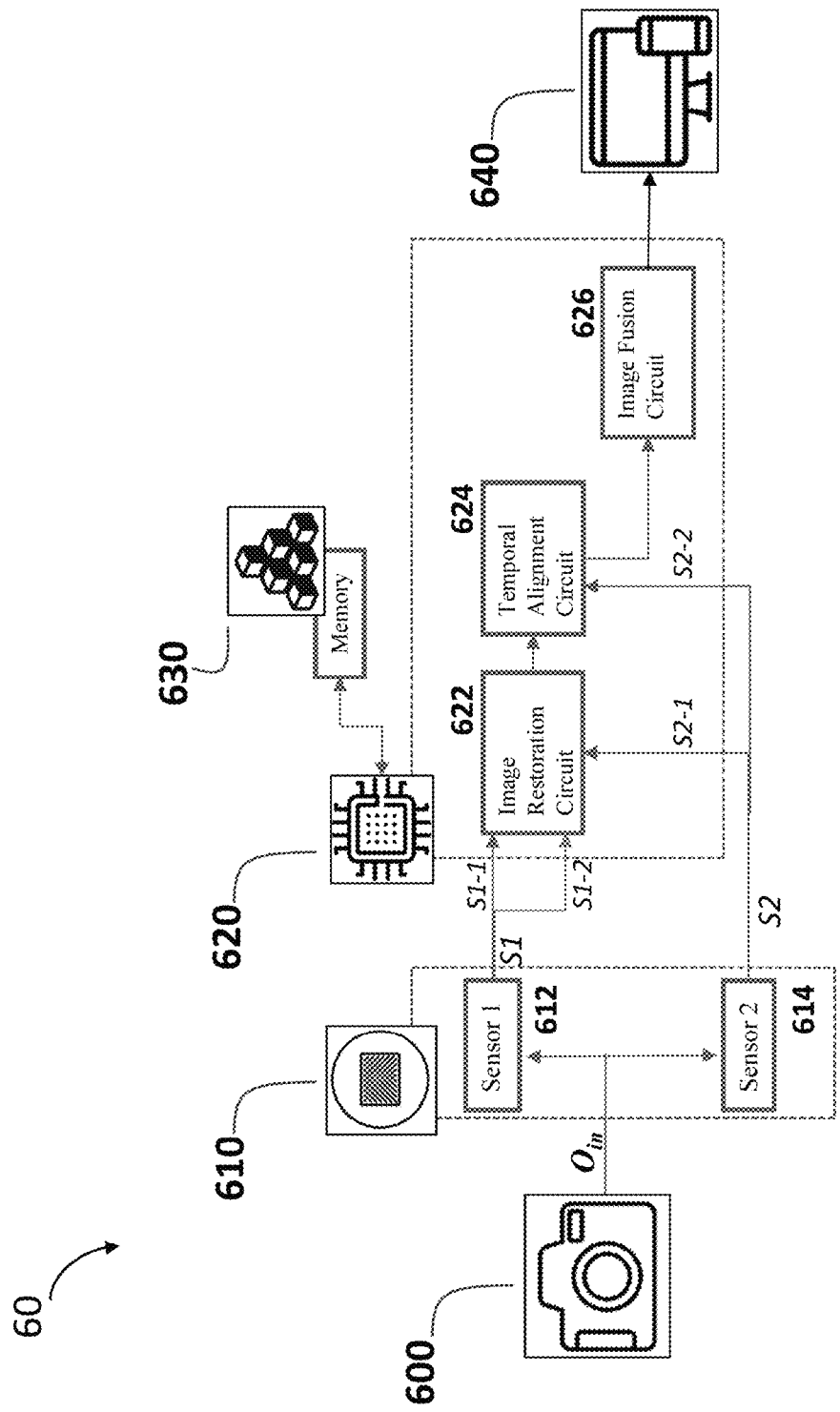
FIG. 6 shows a schematic component configuration of an image processing system in accordance with some embodiments of the instant disclosure.

The exemplary image processing operation 10 begins from an initial stage of obtaining an optical input using a processing device (e.g., device 60 as shown in FIG. 6). An imaging device in accordance with the instant disclosure is provided with dual sensing components of distinct characteristics configured to concurrently capture two distinct components of an optical input. For example, a hybrid imaging device (e.g., device 70 shown in FIG. 7) that comprises integrated first type sensor components (e.g., components C11, C12, C13) designed to capture a first optical component S1 of the optical input, and a second type sensor (e.g., components C2) designed to capture a second optical component S2 of the optical input.

In typical embodiments, one of the two sensing components may include a standard intensity frame based camera (e.g., having CCD or CIS components) capable of obtaining frame-based image data with high pixel resolution (e.g., 1920×1080 or higher). For the context of the instant disclosure, frame-based image data generally refers to a captured optical input component that is depicted in absolute intensity measurement. The frame-based image component of the optical input may be referred to as an active pixel sensor (APS) frame, which is characterized by its relatively low frame rate (e.g., often more than 5 ms latency). As such, the frame-based sensor component is characterized in their ability to obtain image data with high spatial (pixel) resolution yet at a lower temporal resolution (frame rate per unit time). This makes the frame-based camera inherently prone to motion blur when recording highly dynamic scenes. For one thing, since standard cameras produce frames with relatively low temporal information, it presents a challenge to handle motion-induced image distortion issues such as blurring, ghosting artifact, and rolling shutter distortion. While intensity frame rate may be increased to reduce the motion-based distortion effects, the implementation of higher frame rate performance in the intensity-based sensors usually involves additional cost in hardware specification, power consumption, and/or processing time.

While the spatial resolution capability from a standard frame-based camera is essential to the generation of high quality images, embodiments of the instant disclosure simultaneously incorporates a second type of optical sensor that possesses inherently distinct characteristics of operation as a complementary measure for accurate yet efficient motion compensation. In some embodiments, the other type of sensor may include an event-based camera (e.g., EVS sensor) that is characterized in its significantly higher sensitivity to a second component S2 of the optical input $O_{in}$ over the standard intensity-frame based sensor.

The working principle of an event-based cameras (DVS/EVS) is quite different from a traditional frame-based camera. Event cameras employ independent pixels that only generate information referred to as "event(s)" in the presence of a brightness change in the scene at a precise moment of such occurrence. Accordingly, the output of an event sensor is not an intensity image but a stream of asynchronous events recorded in high definition temporal resolution (e.g. microsecond), where each event comprises the time at which it is recorded and a position (or an address) of the respective pixel that detected the brightness change, as well as the polarity of the brightness change (binary intensity change in positive or negative signs).

Since the event generation is induced by brightness changes over time, an event camera is inherently responsive to the detection of edges in a scene in the presence of relative motion. Thus, event cameras offer certain characteristics over standard frame-based cameras, particularly in aspects such as substantially lower latency (in the order of microseconds), low power consumption, and substantially higher dynamic range (e.g., 130 dB compared to 60 dB of standard, frame-based cameras). More importantly, since the pixels of the event sensor are independent, such sensors are inherently immune to motion blurring issue.

In some embodiments, the optical input obtaining process involves acquiring optical input (e.g., $O_{in}$ as illustrated in FIG. 6) by a hybrid imaging device (e.g., device 610 as shown in FIG. 6) that comprises integrated first type sensor component (e.g., sensor component 612) and second type sensor component (e.g., sensor component 614). The first type sensor component is configured to capture a first component S1 of the optical input. Correspondingly, the second type sensor component is configured to record a second component S2 of the optical input that possesses distinct characteristics from that of the first component S1. In some embodiments, the first type sensor component is provided with a first pixel resolution. In some embodiments, the second type sensor component has a second pixel resolution less than the first pixel resolution. In some embodiments, the first type sensor component comprises frame-based image sensor (e.g., CIS component). In some embodiments, the second type sensor component comprises event-based vision sensor (e.g., EVS).

For instance, in the illustrated embodiment, the first type sensor (which corresponds to the frame-based component S1 of the optical input $O_{in}$) is provided with a first pixel resolution and a first temporal resolution. On the other hand, the second type sensor (which corresponds to the event-based component S2 of the optical input $O_{in}$) is provided with a second pixel resolution that is lower than the first pixel resolution and a second temporal resolution greater than the first temporal resolution. It is noted that, depending on operating conditions and application requirements, other types of sensor components may be integrated in the hybrid imaging device to augment the frame-based sensor elements. For one thing, a hybrid imaging device that integrates different types of sensor components with distinct characteristics may enable enhanced imaging processing capabilities suitable for a particular ambient condition or type of application. In some embodiments, a hybrid imaging device may comprise a combination of different types of sensor components, which may include, e.g., standard frame-based camera components, high speed camera components, spike sensor, structured light sensor, event sensor components, ultrasound imaging components, infrared imaging components, laser imaging components, etc.

A combination of the two types of sensor elements from the hybrid imaging device may enable the recording of two distinct components (e.g., S1, S2) of the obtained optical input. Among them, optical component S1 corresponds to a data stream of high pixel resolution frames at a relatively low update frequency (e.g., 30 fps).

In an ideal (but rare) scenario where relative motion between the captured object and the edges of an image frame is absent (e.g., under stable camera operation while recording stationary object), the optical component S1 from a standard frame-based sensing component (e.g., sensor 612 shown in FIG. 6) may be presented by a highly redundant image frame stream. On the other hand, component S2 corresponds to the event-based voxel data (which reflects only the relative movement path of a moving object at a significantly higher update rate) from a complementary event-based sensing component (e.g., sensor 612 shown in FIG. 6). Accordingly, in the exemplary image processing operation 10, the obtained optical input comprises a first component S1 (which may comprise subsets S1-1 and S1-2) and a second component S2 that temporally corresponds to the first component S1. In some embodiments, the first component S1 of the obtained optical input corresponds to a first temporal resolution, while the second component S2 of the obtained optical input corresponds to a second temporal resolution higher than that of the first component S1.

As illustrated in the embodiment of FIG. 1, upon the simultaneous capture of high temporal event data (e.g., second component S2) and its corresponding standard intensity frames (e.g., first component S1: S1-1, S1-2), the image processing implementation proceeds to an image restoration operation 122, in which image restoration operations are performed on a first subset S1-1 of the first optical component S1 in accordance with data from the second component S2 of the obtained optical input. In contrast to image enhancement, in an image restoration process, image distortion/degradation is modeled. Thus, with comprehensive information gathered by the two distinct types of image sensor components, the undesirable effects of the image degradation may be largely removed.

In the context of multi-frame high dynamic range (HDR) imaging applications, the first subset S1-1 of the first optical component S1 of an obtained optical input may be a long exposure frame (LEF), which generally reflects an intensity frame with higher EV (exposure value). On the other hand, the second subset S1-2 of the first topical component S1 of the obtained optical input may be a short exposure frame (SEF) with lower EV. In the illustrated embodiment, the incorporation of the high temporal resolution EVS data (i.e., the second component S2 from a neuromorphic image sensor such as EVS) helps to accurately synchronize the capture time between the intensity based data of the LEF and the SEF (i.e., the first and second subsets S1-1, S1-2 of the first component S1) in a subsequent image fusion process, so as to enhance immunity against the adverse effect such as motion blur and ghosting artifacts commonly observed in the conventional HDR schemes.

Following the image restoration operation 122, the exemplary image processing implementation 10 proceeds to perform an image fusion operation 126, where the output of the image restoration operation 122 and the intensity frame data corresponding to the second subset S1-2 of the obtained optical input is fused to generate enhanced HDR image output. In some embodiments where multi-frame HDR application is concerned, the first subset S1-1 and the second subset S1-2 of the first component of the obtained optical input temporally offset each other (e.g., the sequential sampling data taken in the sequential HDR scheme). In some embodiments, the first subset S1-1 of the first component of the obtained optical input has a longer temporal duration than the second subset S1-2. In the illustrated embodiment, the first subset S1-1 of the first optical component corresponds to a first exposure frame having a first exposure duration (e.g., LEF), while the second subset S1-2 of the first optical component corresponds to a second exposure frame having a shorter second exposure duration (e.g., SEF). Nevertheless, depending on specific implementation arrangement, in some embodiments, the LEF (e.g., S1-1) and SEF (e.g., S1-2) may temporally overlap each other. In some embodiments, the sampling of LEF and the SEF may be initiated simultaneously.

In some embodiments, the image restoration operation 122 comprises performing a selective combination of a de-blurring operation or rolling shutter distortion correction (RSDC) operation. In the illustrated embodiment, the image restoration operation 122 includes a first restoration process 122a designated particularly to the processing of the first subset S1-1 (e.g., the LEF) of the first optical component (e.g., the intensity frame based component), as the longer exposure duration of the first subset S1-1 makes the first sampling frame inherently prone to motion based image distortion. In applications where CMOS image sensors are used without a global shutter arrangement, the selective RSDC operation in the first restoration process 122a would serve a vital role in upholding the image restoration accuracy during the image processing implementation 10. In some embodiments, the first image restoration process 122a is performed in accordance with a first portion S2-1 of the second component S2, which is temporally associated with the first subset S1-1 of the first component of the obtained optical input. For instance, the event-based data with high temporal resolution is utilized as reference basis for the restoration of the intensity frame based CIS data of subset S1-1.

In some embodiments where additional restoration accuracy is desired, the image restoration operation 122 may further include the performing of additional image restoration operation (e.g., a second restoration process 122b) on the second subset S1-2 of the first component S1 of the obtained optical input. In such embodiments, the additional image restoration operation 122b may be performed in accordance with a second portion S2-2 of the second component S2 of the optical input. In some embodiments, the additional image restoration operation (e.g., the second restoration process 122b) may comprise RSDC processing on the second subset S1-2 of the first component S1 of the obtained optical input. For example, in the embodiments where CMOS based sensor components with rolling shutter arrangement is adopted, the provision of an additional RSDC module may be appreciated.

In the illustrated embodiment, the image processing implementation 10 further includes performing temporal alignment operation 124 on the first subset S1-1 of the first component S1 of the obtained optical input. In some embodiments, the temporal alignment operation 124 is performed in accordance with data from the second component S2 (e.g., S2-1). Owing to the higher temporal resolution from the second component S2 (e.g., EVS data), the temporal alignment accuracy between the LEF (e.g., S1-1) and SEF (e.g., S1-2) may be increased. Particularly, in some embodiments, the temporal alignment operation 124 may be performed in accordance with a first portion S2-1 of the second component S2 that temporally corresponds to the first subset S1-1 of the first component S1 of the obtained optical input. Moreover, in some embodiments, the temporal alignment operation 124 is performed further in accordance with a second portion S2-2 of the second component S2 that temporally corresponds to the second subset S1-2 of the first component S1 of the obtained optical input. For example, in the illustrated embodiment, the second portion S2-2 of the second optical component S2 is utilized to generate a SEF time stamp TS1-2 that further aids the accuracy of image data synchronization.

Figure 2:
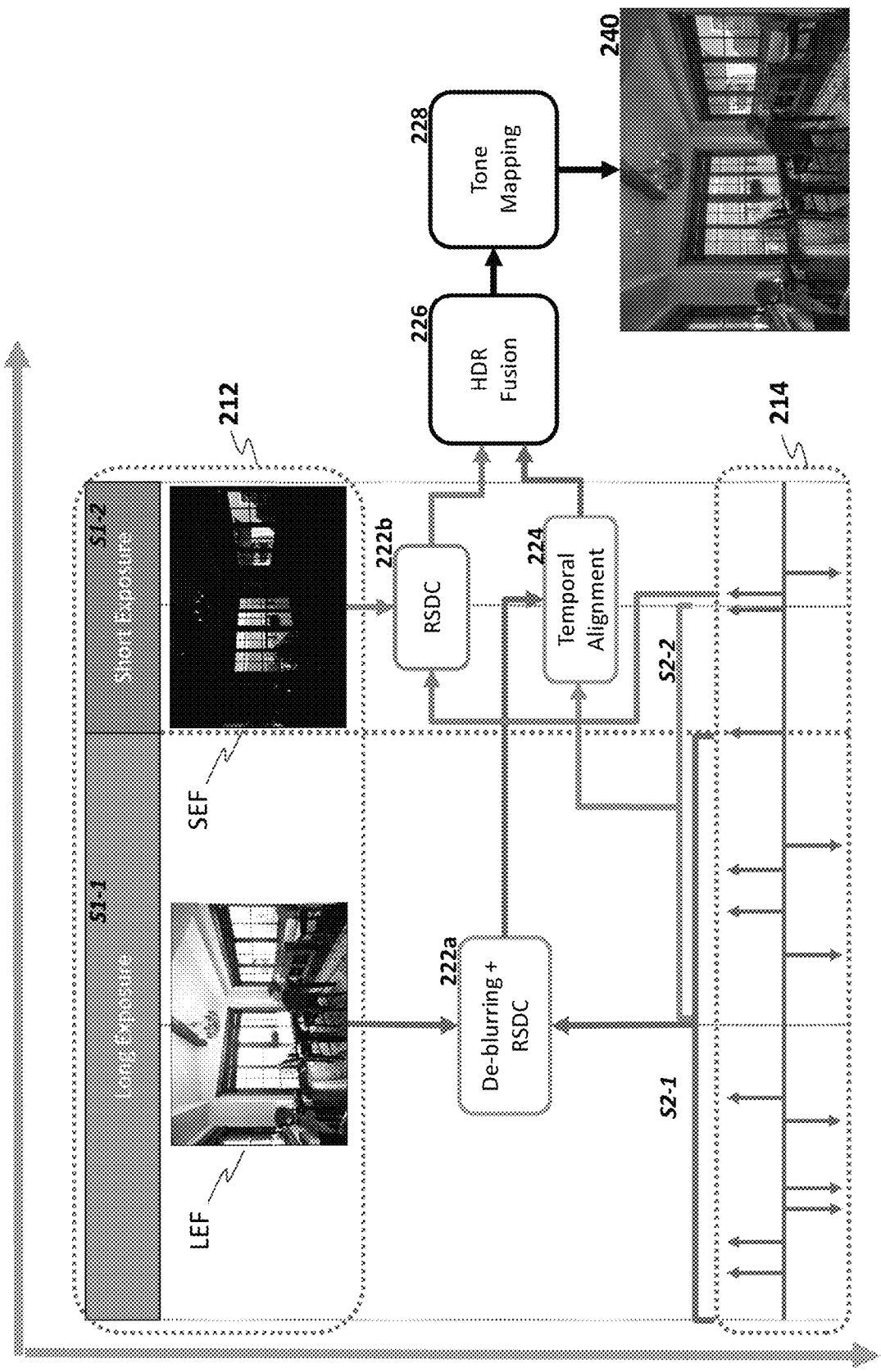
FIG. 2 shows a schematic image processing operation in accordance with some embodiments of the instant disclosure.

FIG. 2 shows a schematic image processing operation in accordance with some embodiments of the instant disclosure. As shown in the illustration of FIG. 2, the exemplary image processing operation is applied to an optical input of a dining hall, in which a bright outdoor scenery is shown in a far background of a dining hall interior through a series of French windows in the mid-ground.

Along the top of the illustration shows a first component (e.g., CIS data 212) of an obtained optical input (e.g., intensity frame based image data of the scenery of a dining hall). The first component 212 of the obtained optical data may be captured, e.g., by a CIS component of a hybrid imaging device (e.g., component 612 as illustrated in FIG. 6). In the illustrated embodiment, the CIS component 212 of the obtained optical input comprises a pair of sequentially recorded subsets, i.e., a preceding long exposure frame (LEF) data S1-1 and a succeeding, non-temporally overlapping short exposure frame (SEF) data S2-1. It should be noted, however, that the order, as well as the number of subsets among the CIS data shown in the instant embodiment are provided merely for exemplary purposes. Depending on specific application or operational requirement, the number of the CIS data subset (i.e., number of sampling frames), as well as the order and duration of each of the sampling frames may be different from that shown in the instant embodiment.

As can be observed from the illustration, the recorded image in the LEF S1-1 provides a clear view on the interior details of the dining hall, yet presents difficulties in properly reflecting the outdoor details beyond the French windows due to over-exposure of the bright outdoor scenery. Conversely, the recorded image in the SEF S1-2 is capable of showing a clear view on the outdoor scenery beyond the series of French windows, yet appears to be inadequate in showing the details of the interior foreground in the dining room.

Along the bottom of the illustration shows a second component (e.g., EVS data 214) of the obtained optical input (e.g., event based voxel data of the scenery of the dining hall). The second component 214 of the obtained optical data may be recorded, e.g., by an EVS component of a hybrid imaging device (e.g., component 614 as illustrated in FIG. 6). Compared to the conventional intensity based image data, the EVS data 214 is not an intensity image but a stream of asynchronous events at microsecond resolution (e.g., as shown by the series of upward and downward pointing arrows along the time axis). Moreover, each event data generated there-by comprises an associated space-time coordinate and a sign of corresponding brightness change (positive or negative polarity, as illustrated by the upward and downward pointing directions) without intensity information.

The high temporal resolution of the EVS data 214 enables the generation of precision timestamp that corresponds to the CIS data 212, which in turn provides vital information for further refined image restoration as well as for the subsequent frame synchronization operations. It is also noted that, in the instant embodiment, while the subsets of the CIS data 212 (e.g., the LEF S1-1 and the SEF S1-2) are taken sequentially in a temporally non-overlapping manner, the corresponding portions (e.g., S2-1, S2-2) of the EVS data 214 utilized for image restoration processing do not fully offset each other (see, e.g., the temporally overlapping portion between S2-1 and S2-2 being fed to the temporal alignment operation module 224).

Upon the simultaneous capture of the high temporal EVS data 214 and the corresponding intensity based CIS data 212, both components of the obtained optical input are forwarded to an image restoration operation module. For instance, a first image restoration operation 222a is performed on the LEF portion S1-1 of the CIS data 212 in accordance with the corresponding portion S2-1 of the EVS data 214. In the instant embodiment, the first image restoration operation 222a performs both de-blurring and RSDC processes on the first subset S1-1 of the CIS data 212, so as to address the inherent vulnerability of the LEF to motion based image distortion.

For the handling of a comparatively static scenery with relatively dramatic brightness contrast, the instant embodiment further incorporates a second image restoration operation 222b on the SEF portion S1-2 of the CIS data 212 in accordance with the corresponding portion S2-2 of the EVS data 214. Particularly, the second image restoration operation 222b comprises performing additional RSDC processing on the SEF data S1-2 based on the corresponding portion of the EVS data 214. The additional RSDC processing of operation 222b may provide enhanced robustness for applications that employ CMOS image sensors without a global shutter arrangement.

Following the image restoration operation 222a, the processed CIS data subset (e.g., LEF S1-1), along with the corresponding EVS data 214, are forwarded to a temporal alignment module 224 for further processing. Accordingly, the temporal alignment of operation module 224 may be performed in accordance with data from the EVS data 214

(e.g., S2-1 and part of S2-2). Owing to the higher temporal resolution from the EVS data 214, the accuracy of temporal alignment between the LEF S1-1 and SEF S1-2 may thus be increased.

Next, the output of the temporal alignment operation 224 on the LEF data subset S1-1, along with the further processed SEF data subset S1-2, are forwarded to a HDR fusion operation module 226 for HDR image fusion processing. With the incorporation of the high resolution temporal data (e.g., data 214) from the EVS sensor component in the multi-frame HDR imaging pipeline, image restoration performance may be further refined and frame synchronization may be more accurate, thereby providing higher immunity against undesirable image distortion effect such as motion blur, ghosting artifacts, and rolling-shutter distortion. The fused image data from the HDR fusion operation 226 is subsequently forwarded to a tone mapping operation module 228 for further processing, before an output 240 may be generated. In some embodiments, conventional tone mapping schemes may be applied for post HDR fusion processing. As can be observed from the output 240, as a result of the image processing operation in accordance with the instant embodiment, the outcome image retained both the clear interior details in the foreground of the dining hall as well as the vivid outdoor background beyond the series of French windows.

Figure 3:
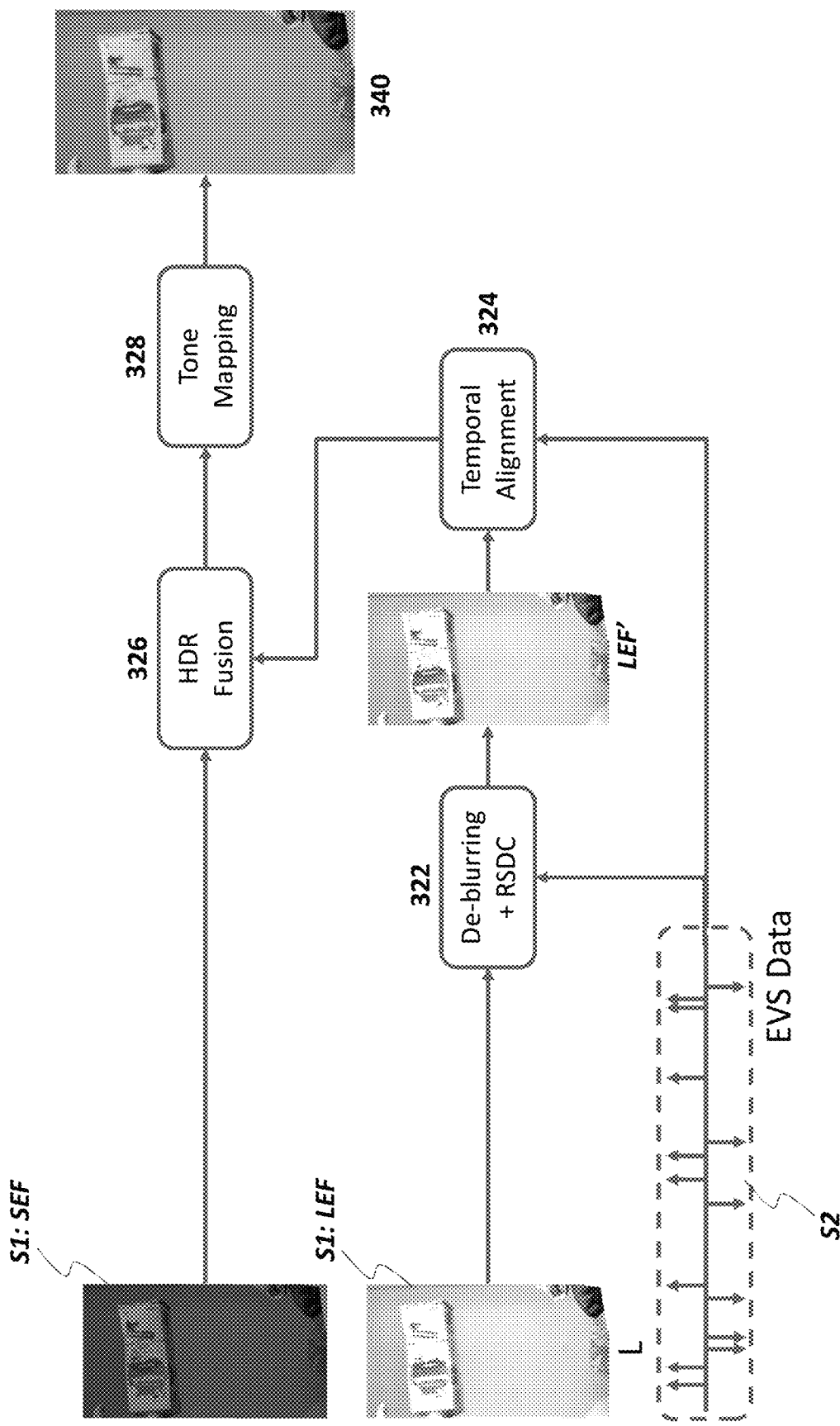
FIG. 3 shows a schematic image processing operation in accordance with some embodiments of the instant disclosure.

FIG. 3 shows a schematic image processing operation in accordance with some embodiments of the instant disclosure. As shown in the illustration of FIG. 3, the exemplary image processing operation is applied to a more dynamic scenario, in which a Tetra Pak milk container is being dropped to a free fall by hand from the top of the scene.

Along the upper left of the illustration shows a first subset data (e.g., SEF) of a CIS component S1 of an obtained optical input (e.g., intensity frame based image data of the scenery of a falling milk container). In the illustrated embodiment, the first subset SEF corresponds to a short exposure frame of the object scenery (which may be observed by the relative dimness). On the other hand, the middle left of the illustration shows a second subset data (e.g., LEF) of the CIS component S1, which, in this case, corresponds to a long exposure frame of the object scenery (as can be distinguished by its relative brightness). The bottom left of the illustration shows an EVS component S2 of the obtained optical input (e.g., event based voxel data of the scene). The EVS data S2 comprises an associated space-time coordinate and a sign of corresponding brightens change reflected in a positive or a negative polarity, as illustrated by the upward and the downward pointing arrows. As discussed before, the specific order, duration, and the number of subsets among the CIS data shall not be limited to those provided in the illustration of the exemplary embodiment. Depending on specific application or operational requirement, the number of the CIS data subset (i.e., number of sampling frames), as well as the order and duration of each of the sampling frames may be different from that shown in the instant illustration.

In the instant embodiment, with the incorporation of the corresponding EVS data S2, an image restoration operation 322 is performed on the LEF data of the CIS component S1. Due to the dynamic nature of the falling object, the image restoration operation 322 of the instant embodiment incorporates both the de-blurring and the RSDC modules, so as to compensate for the inherent vulnerability of the longer exposure duration thereof, thereby raising the immunity against the undesirable effects of motion blurring and ghosting artifacts. As the result of the image restoration operation 322, an enhanced image data of LEF' is generated.

In contrast, due to the brevity of the SEF data, the instant embodiment chooses to omit the additional image restoration operation (e.g., an additional RSDC processing) on the SEF data. For one thing, in the embodiments where short-enough exposure times are applied, or when the motion of the target object is slow enough, the de-blurring and the RSDC processing may be selectively omitted in favor of computation efficiency.

Following the image restoration operation 322, the processed CIS data subset (e.g., LEF'), along with the corresponding EVS data S2, are forwarded to a temporal alignment module 324 for further processing. Owing to the higher temporal resolution from the EVS data S2, the accuracy of the subsequent alignment between the LEF and SEF may be increased.

Next, the output of the temporal alignment operation 324 (e.g., LEF'), along with the SEF data subset, are forwarded to a HDR fusion operation module 326 for HDR image fusion processing. With the incorporation of the high resolution temporal data from the EVS sensor component in the multi-frame HDR imaging pipeline, image restoration performance may be further refined, and frame synchronization may be more accurate, thus enabling higher immunity against undesirable image distortion effect such as motion blur, ghosting artifacts, and rolling-shutter distortion.

The fused image data from the HDR fusion operation 326 is subsequently forwarded to a tone mapping operation module 328 for further processing, before an output 340 may be generated. In some embodiments, conventional tone mapping schemes may be applied for post HDR fusion processing.

Figure 4A:
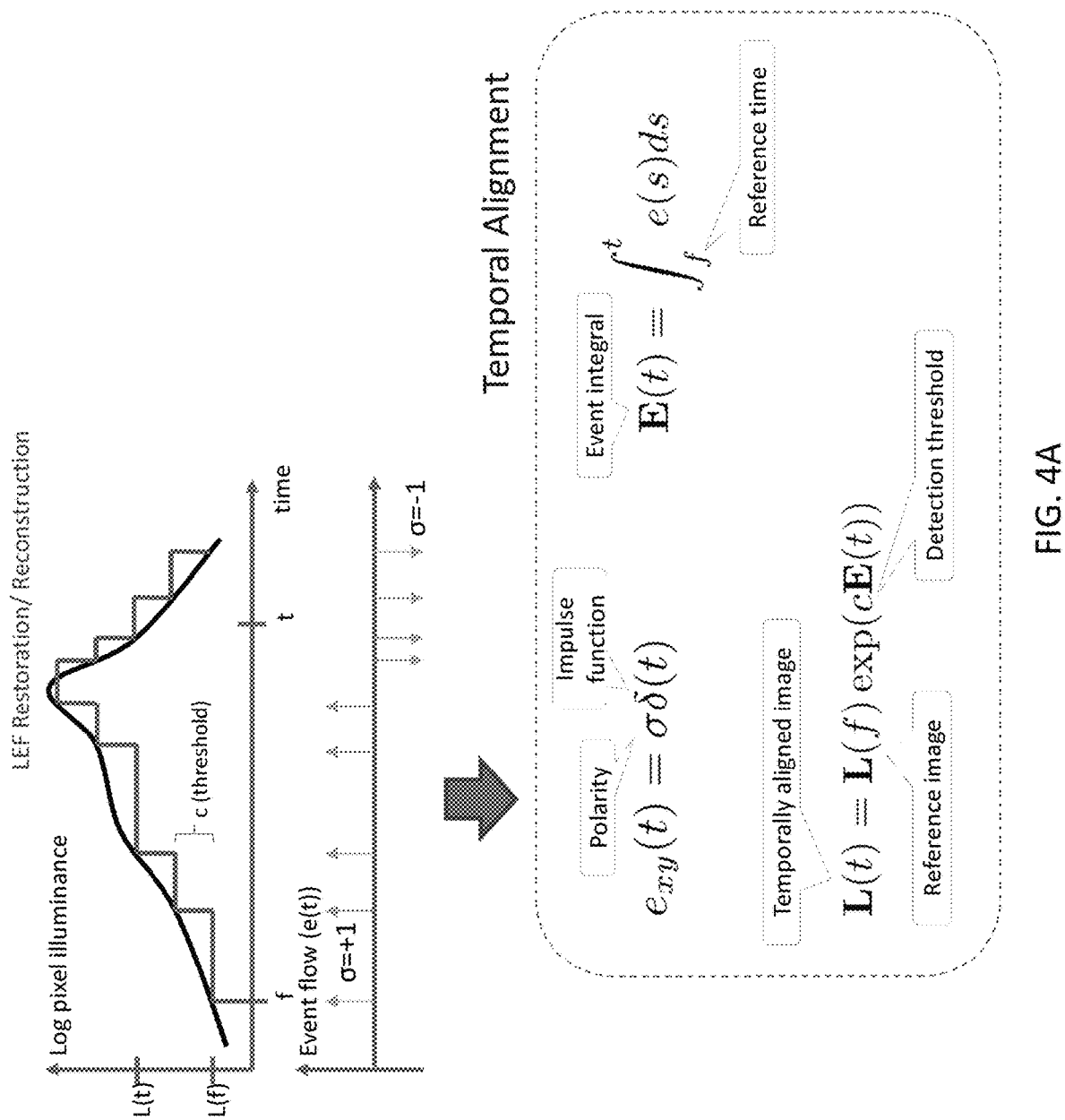
FIGS. 4A-4C illustrate a pair of temporally associated intensity-frame based image data and event based voxel data along with some exemplary image restoration techniques in accordance with some embodiments of the instant disclosure.
Figure 4B:
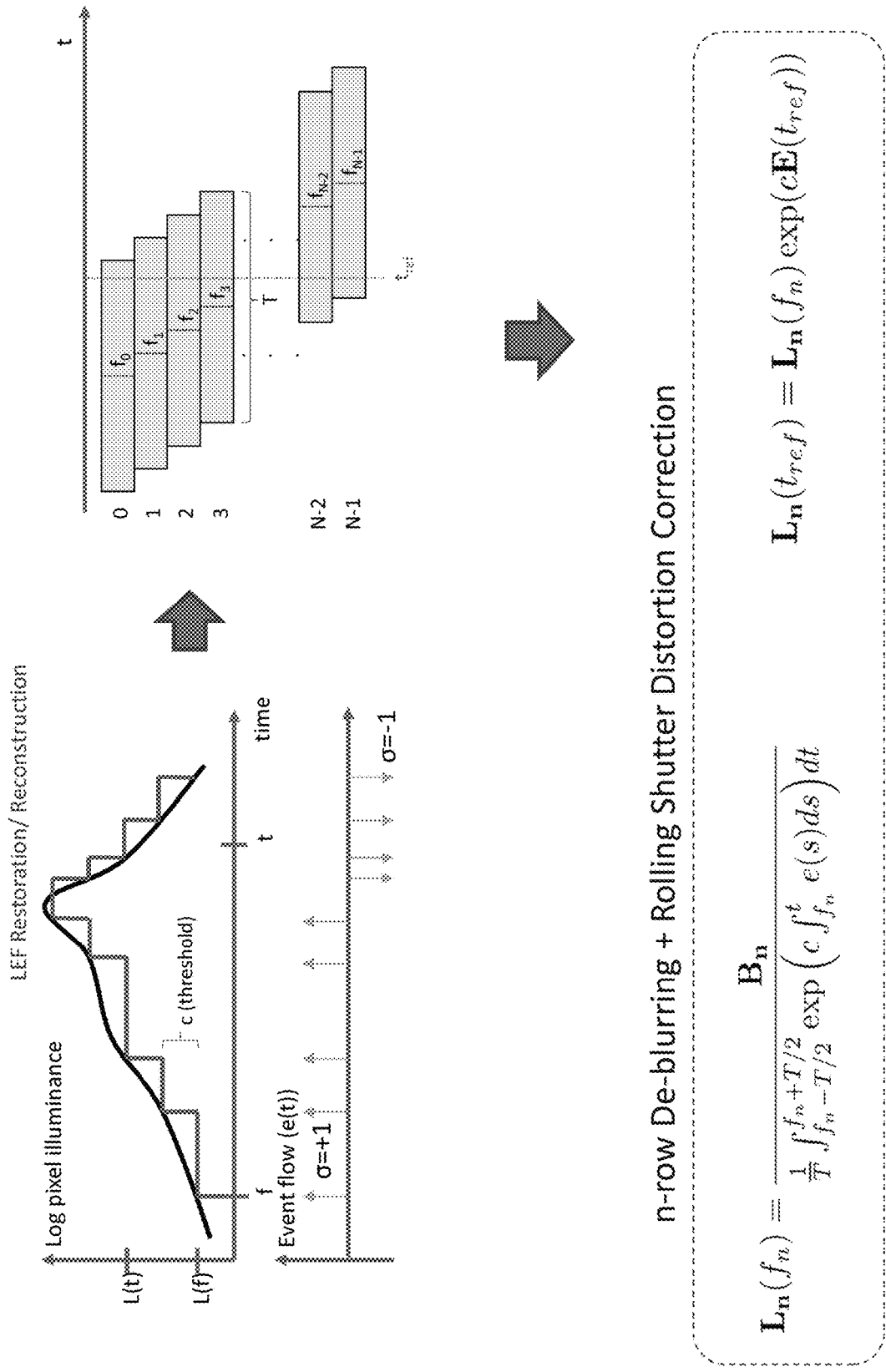
Figure 4C:
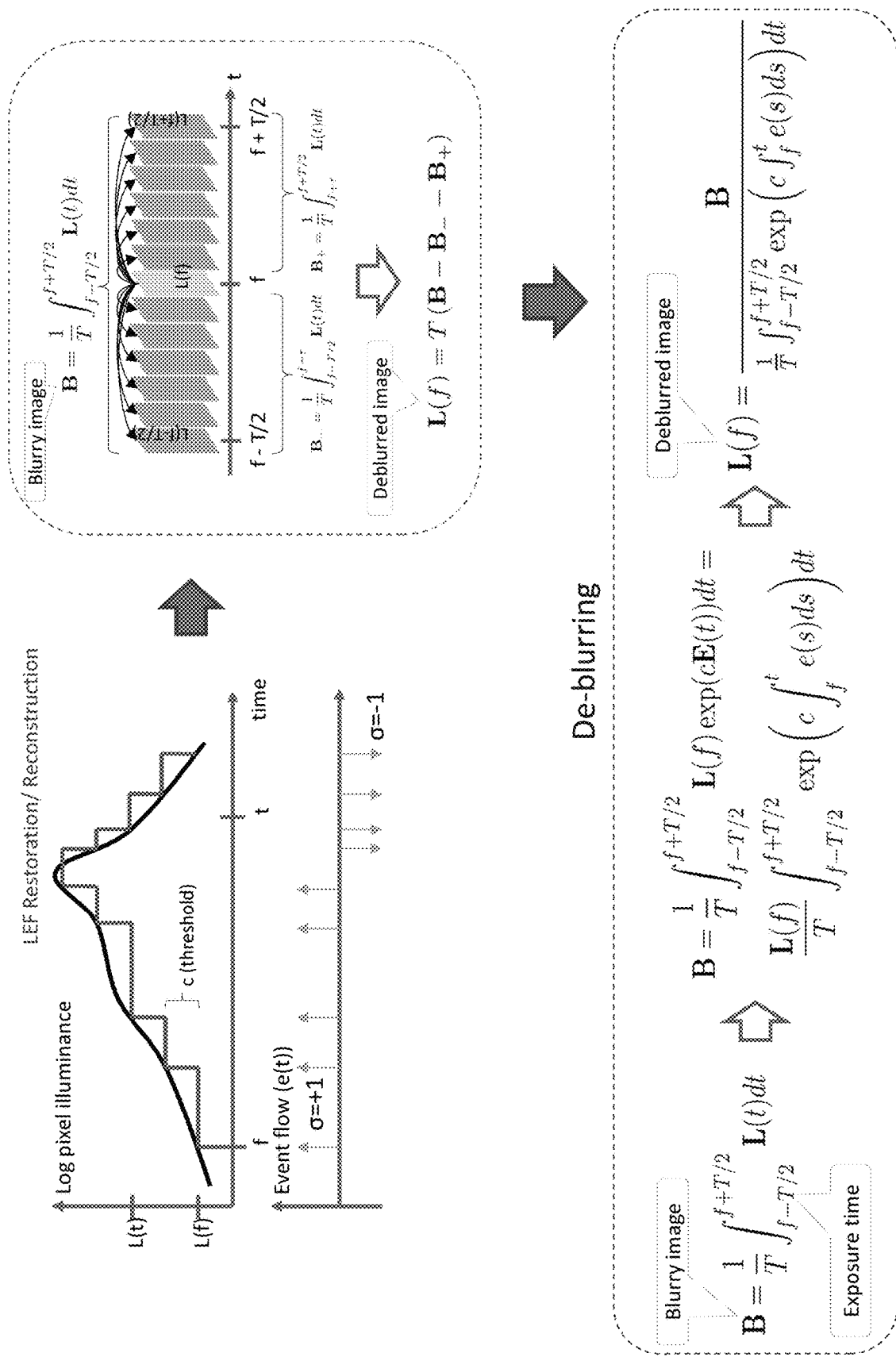

FIGS. 4A-4C illustrate a pair of temporally associated frame-based intensity image data and event-based voxel data along with some exemplary image restoration algorithms in accordance with some embodiments of the instant disclosure. Particularly, each of the FIGS. 4A-4C illustrates a pair of corresponding CIS data (e.g., the upper coordinate system that shows the log of pixel illuminance with respect to time) and EVS data (e.g., the lower coordinate system that shows the polarity of event flow with respect to time). Among the labels along the axes, the upward and downward arrows in the EVS data indicates the corresponding polarity of the event voxels, while the threshold value c in the CIS data corresponds to the predetermined threshold (e.g., sensitivity increment) of an event sensor component.

A variety of known techniques may be adopted to the processing of the CIS and the EVS data. By way of example, FIG. 4A illustrates applicable techniques for temporal alignment, made possible by utilizing the pair of corresponding CIS and EVS data, FIG. 4B illustrates exemplary algorithms for de-RSDC processing, while FIG. 4C illustrates applicable computation scheme for the de-blurring operation, respectively. Cooperatively, the CIS data and the EVS data may enable the restoration/reconstruction of an originally captured CIS data (e.g., LEF data) that may be prone to motion-induced image distortion. As the actual image restoration technique applied may depend on practical requirements of specific implementations (and therefore is not the primary focus of this disclosure), the above examples will be provided herein for reference purpose; further discussion of the specific computational techniques will thus be omitted in favor of disclosure brevity.

Figure 5A:
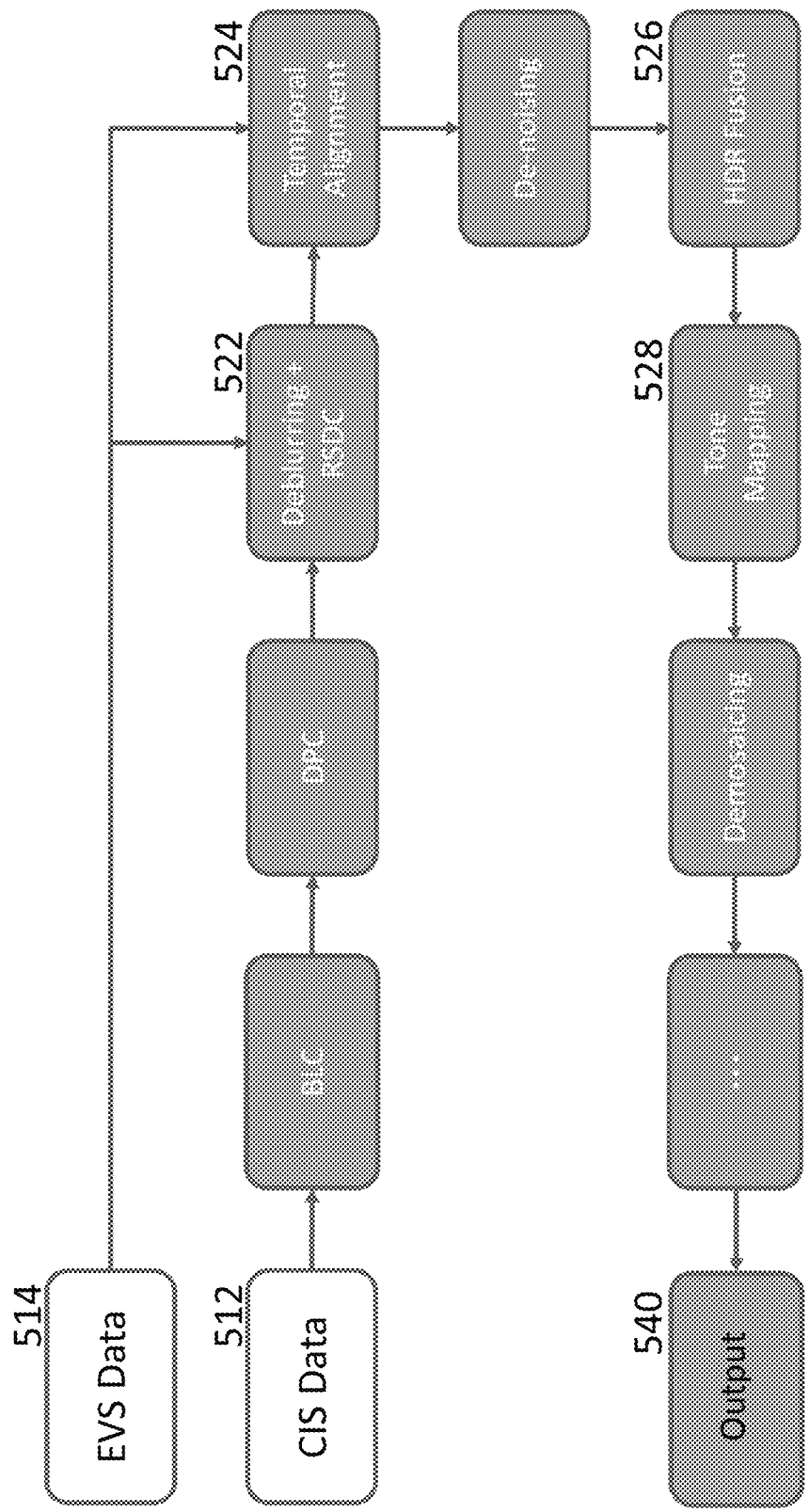
FIGS. 5A-5C show exemplary image processing pipelines in accordance with some embodiments of the instant disclosure.
Figure 5B:
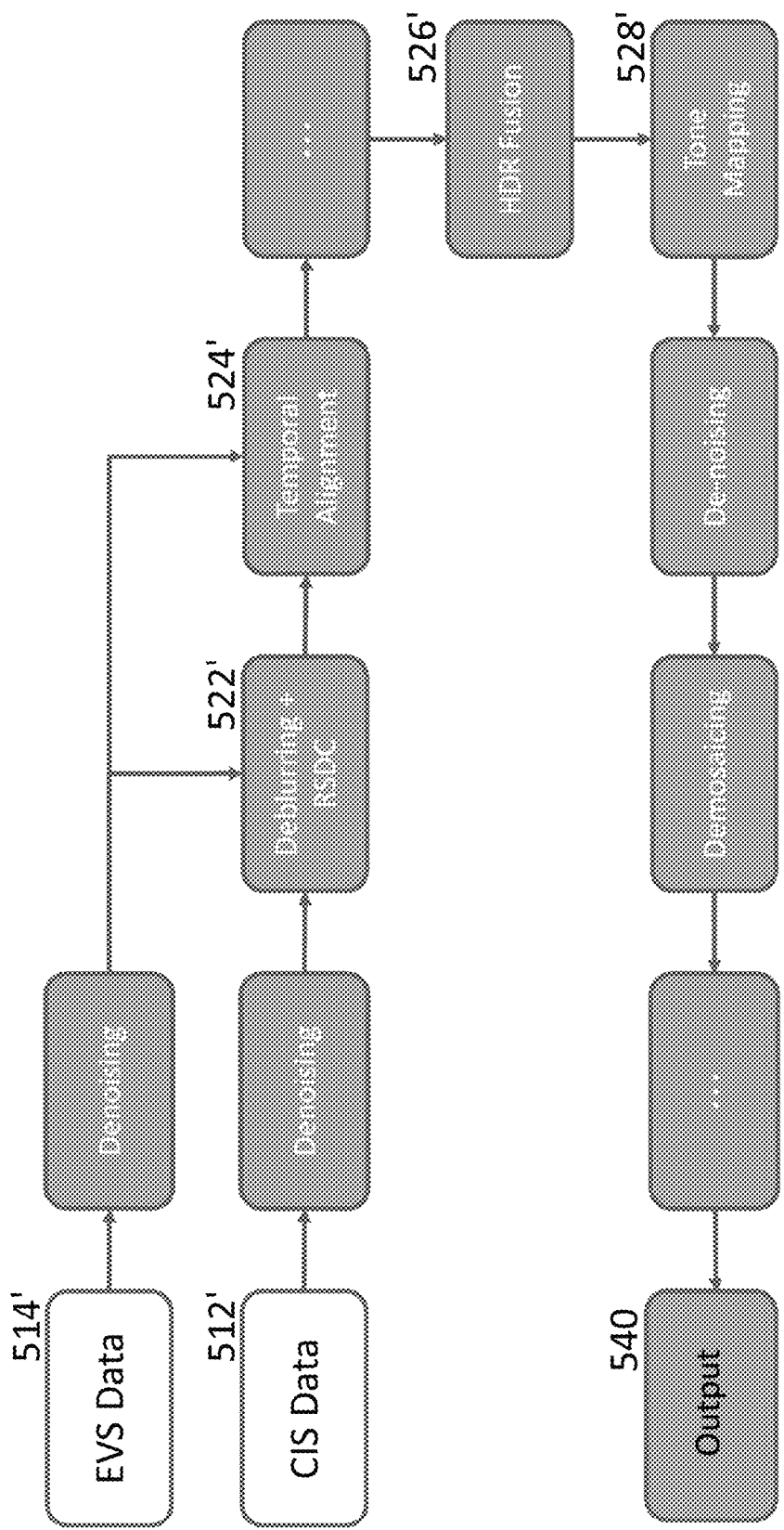
Figure 5C:
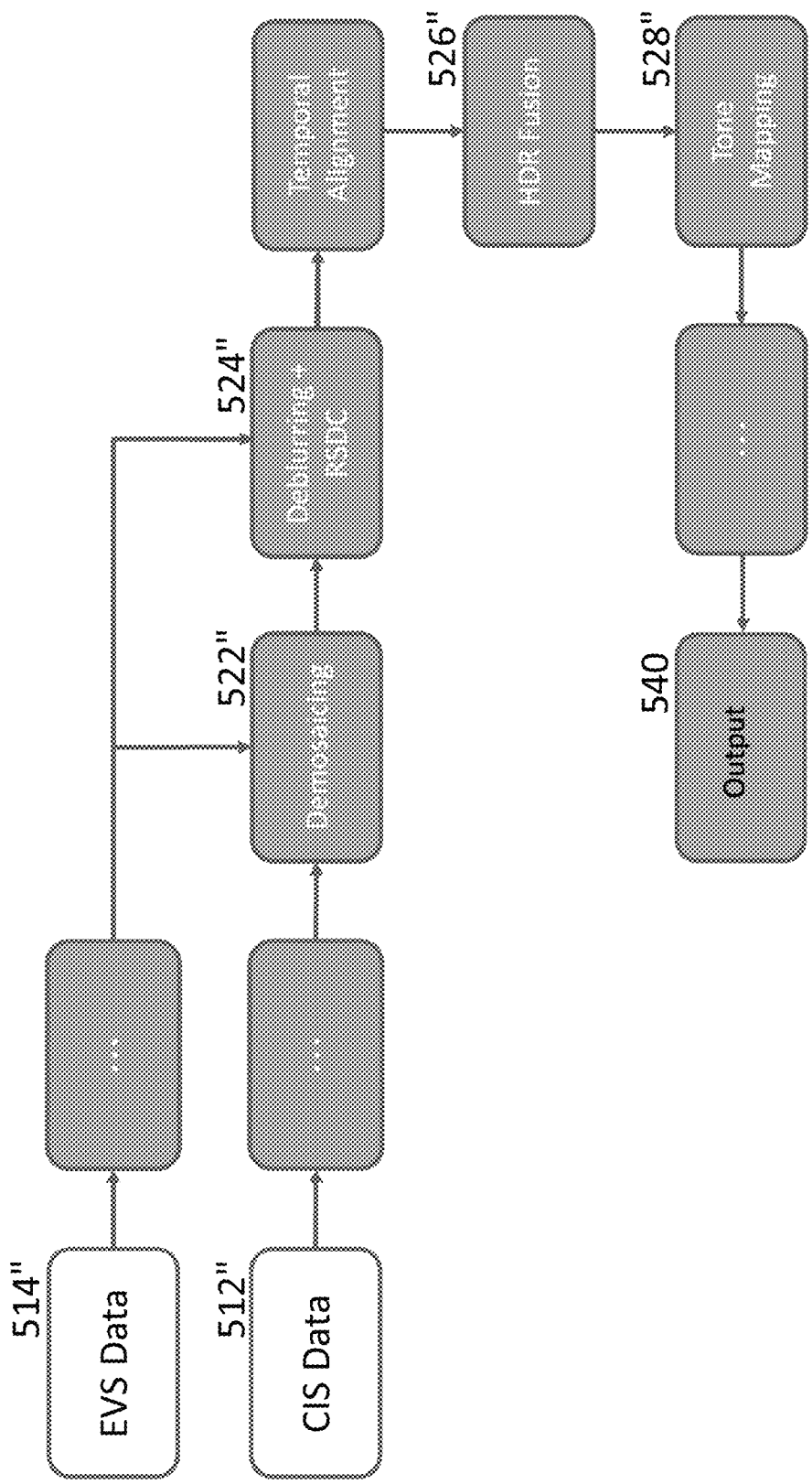

The main domain of applicability of the instant disclosure rests inside an imaging pipeline that incorporates HDR capabilities. This can be, e.g., as a part of the pipeline of an Image Signal Processor (ISP). For example, CIS data can be fed to the instantly disclosed image processing pipeline after some conventional functional blocks, which may include, but not limited to black level correction (BLC), defect pixel correction (DPC), de-noising, de-mosaicing, etc. Likewise, the result of the instantly disclosed algorithms can be further processed by other functional blocks such as de-noising, de-mosaicing, color correction, sharpening, etc. By way of non-exhaustive examples, FIGS. 5A-5C illustrate some exemplary image processing pipelines in accordance with some embodiments of the instant disclosure.

Moreover, the preceding embodiments in accordance with the instant disclosure may be implemented in hardware, firmware or via the use of software or computer codes capable of being stored in a recording medium such as a CD ROM, RAM, a floppy disk, a hard drive, a magneto-optical disk, downloadable computer code over a data network stored in a remote recording medium, or a non-transitory machine readable medium and to be stored on a local recording medium. In some embodiments, the image processing method described herein may be rendered using such software stored on a recording medium using a general purpose computer, an application specific processor, or in programmable or dedicated hardware, such as an ASIC or FPGA. As would be understood in the art, the computer, the processor, microprocessor controller, or the programmable hardware may include memory components, e.g., RAM, ROM, Flash, etc., which may be used to store or receive software or computer code such that, when accessed and executed by the computing device, causes the processor or hardware implement to perform the processing methods described herein. Furthermore, it would be recognized that when a general purpose computer accesses code for implementing the processing shown herein, the execution of the code transforms the general purpose computer into a special purpose computer for executing the processing described herein.

FIG. 6 shows a schematic component configuration of an image processing system in accordance with some embodiments of the instant disclosure. By way of example, the exemplary image processing system may be employed to carry out the image processing implementation in accordance with the instant disclosure, as depicted in the previous embodiments.

The exemplary image processing system 60 comprises a camera 600 that incorporates a hybrid imaging device 610, which comprises a first type sensor component 612 and a second type sensor component 614. Among them, the first type sensor 612 is configured to be sensitive to a first component (e.g., S1 as shown in FIG. 1) of an obtained optical input $O_{in}$, while the second type sensor 614 is configured to be responsive to a second component (e.g., S2 as shown in FIG. 1) of a captured input. The second component S2 temporally corresponds to the first component S1. In some embodiments, the second component S2 corresponds to a temporal resolution that is higher than that of the first component S1.

For instance, in some embodiments, the first type sensor 612 comprises intensity based optical sensor, and the first type component of the optical input comprises intensity frame-based image data (e.g., S1-1, S1-2). In some embodiments, the second type sensor 614 comprises event-based optical sensor, and the second component of the optical input comprises event-based voxel data (e.g., component S2). Accordingly, the second type sensor 614 would have a lower spatial resolution than the first type sensor 612, while boosting a temporal resolution that is significantly higher than that of the first type sensor 612.

The camera 600 further comprises a processing device 620 arranged in signal communication with the hybrid imaging device 610, configured to receive and process the output from both the first and the second type sensors 612, 614. In some embodiments, the processing device 620 may comprise a processer incorporated as a part of an integrated circuit, which comprises various circuits, each for performing a particular function as depicted in the previous embodiments. For instance, depending on application, the processing device 620 may be implemented as a multi-functional computing hardware or an application specific hardware. For example, applicable types of processing devices may include central processing unit (CPU), digital signal processor (DSP), image signal processor (ISP), etc. In some embodiments, a processor may include a multi-core processor that contains multiple processing cores in a computing device. In some embodiments, various elements associated with the processing device 620 may be shared by other devices.

In the illustrated embodiment, the exemplary processing device 620 is provided with an image restoration module 622, which may contain dedicated or shared hardware circuitry, software, or firmware components to perform image restoration operations based on the first component S1 of an obtained optical input. By way of example, the image restoration module 622 is configured to respectively process both the first component S1 of the optical input from the first type sensor 612 and the second component S2 of the optical input from the second type sensor 614. For instance, the image restoration unit 622 may be configured to process a first subset S1-1 of the first optical component S1 based at least in part on the second component data S2 from the second type sensor 614.

The processing device 620 is further provided with an image fusion module 624 arranged downstream of the image restoration module 622, which may incorporate necessary hardware circuitry, software, and firmware components to perform image fusion operations based on output from the image restoration module 622. In the instant embodiment, the image fusion module 626 is configured to generate image data based on output from the image restoration module 622, as well as on a second subset data S1-2 of the first component S1 of the obtained optical input $O_{in}$. In some embodiments, the first subset S1-1 and the second subset S1-2 of the first component S1 may be arranged to temporally offset each other. In some embodiments, the first subset S1-1 of the first optical component S1 may be configured with a longer temporal duration than that of the second subset S1-2. For example, in the context of multi-frame high dynamic range imaging applications, the first subset data S1-1 of the first optical component S1 may correspond to a first exposure frame of a first duration. For instance, the first subset data S1-1 may correspond to a long exposure frame (LEF) that generally possesses a higher exposure value (EV).

The image restoration operation by the image restoration module 622 may include algorithms with distortion/degradation models designed for alleviating motion blurring, ghosting artifacts, and rolling shutter distortion effects. In some embodiments, the image restoration module 622 is configured to perform a selective combination of de-blurring operation and a rolling shutter distortion correction (RSDC) operation on the first subset S1-1 of the first optical component S1. For instance, as the longer exposure duration of a LEF (e.g., subset data S1-1) makes the first sampling frame inherently prone to motion based image distortion, in some embodiments, the image restoration module 622 is provided with a first restoration unit (not explicitly illustrated, yet functionally corresponds to block 122a of FIG. 1) designated particularly to the perform de-blurring/de-ghosting operations on the first subset S1-1 (e.g., the LEF) of the first optical component S1. On the other hand, in applications where CMOS image sensors are used without a global shutter arrangement, the first restoration unit may be further configured to incorporate RSDC processing functionalities.

In some embodiments, the image restoration module 622 is configured to operate in accordance with a first portion (e.g., event data S2-1) of the second optical component S2, which corresponds temporally to the first subset S1-1 of the first optical component S1. For instance, in the instant embodiment, the event-based data S2-1 with high temporal resolution is utilized as reference basis for the restoration of the intensity frame based CIS data of subset S1-1.

In some embodiments, the image restoration module 622 is further provided with an additional image restoration unit (not explicitly illustrated, yet functionally corresponds to block 122b of FIG. 1) configured to process the second subset data S1-2 of the first optical component S1. In some embodiments, the additional image restoration unit may be configured to perform image restoration operations on the second subset S1-2 data based at least in part on a second portion of the second optical component S2. In some embodiments, e.g., in applications where CMOS based sensor components with rolling shutter arrangement is adopted, the additional image restoration unit may be configured to perform RSDC processing on the second subset S1-2 of the first optical component S1.

In the illustrated embodiment, a temporal alignment module 624 is signal communicatively arranged between the image restoration module 622 and the image fusion module 626. The temporal alignment module 624 may be configured to perform temporal alignment operation on the first subset data S1-1 of the first optical component S1 based at least in part on the data from the second optical component S2. In some embodiments (e.g., where a temporal duration of the second subset data S1-2 is long and comparable to that of the first subset data S1-1), the temporal alignment module 624 may be further configured to perform temporal alignment operation on the second subset S1-2 of the first component of the obtained optical input.

It is noted that each of the various functional modules/circuits 622, 624, and 626 of the processing device 620 may be formed by common or different circuitry within a processing unit, and configured to execute program instructions read from a memory 630 coupled thereto. For instance, the memory 630 may be used by one or more of the shown circuits of the processing device 620 for interim storage during calculations, and for storing computed data. The memory 630 may also store program instructions read and executed by the processing device 620 to carry out its operations.

A display 640, which may be a stationary or a mobile device, is signal communicatively coupled to the processing device 620 for displaying the image or video output.

Figure 7:
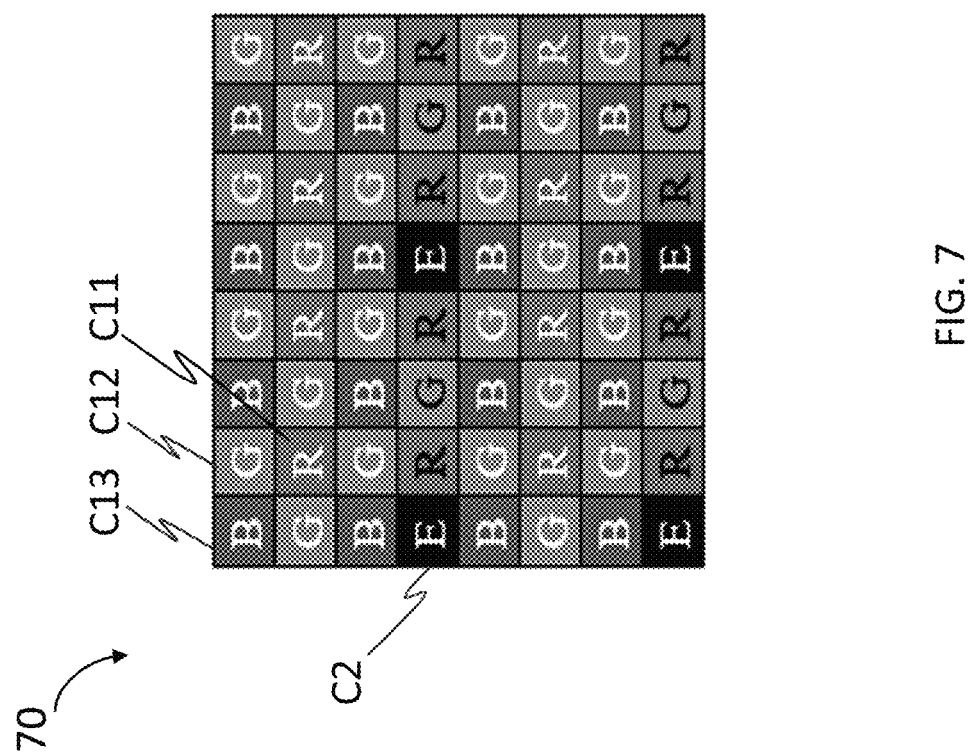
FIG. 7 shows a schematic illustration of a hybrid imaging device in accordance with some embodiments of the instant disclosure.

FIG. 7 shows a schematic illustration of a hybrid imaging device in accordance with some embodiments of the instant disclosure. By way of example, in some embodiments, a hybrid imaging device comprises a fusion image sensor chip that incorporates both CMOS elements and DVS sensor components over a common sensing interface.

For instance, FIG. 7 shows a schematic sensor component layout for a hybrid imaging device 70 that comprises a plurality of first type sensor cells C11, C12, C13 and a plurality of second type sensor cells C2 collectively arranged in an interleaving matrix pattern. In the illustrated embodiment, the first type sensor cells C11, C12, and C13 correspond respectively to the red R, green G, and blue B subpixels of a CMOS image sensor, while the second type sensor cells C2 correspond to an array of dynamic vision sensor (DVS) cells that are inserted interleavingly among the second type sensor cells. It should be noted, however, that the actual hardware implementation of a hybrid imagine device may vary from that shown in the instant figure without departing from the context of the instant disclosure. For instance, the specific relative position of the sensor cells, the actual cell density distribution, the relative size, or the spectral response of each sensor cell may vary. In some embodiments, the different types of sensor cells may be embodied at different layers in an integrated sensor chip in an overlapping manner.

For such an embodiment, because motion related information is only generated in the presences of brightness changes for the event-based DVS cells (e.g., cells C2), the exemplary hybrid imaging device 70 may remove the inherent redundancy of a standard frame-based sensor cells (e.g., C11, C12, C13), thereby requiring a substantially lower data rate.

For instance, the output of the event-based sensor cell (e.g., S2 illustrated in FIG. 1) is not an intensity image but a stream of asynchronous events at microsecond resolution. Thus, each event data generated there-by comprises an associated space-time coordinate and a sign of corresponding brightness change (positive or negative, without intensity information).

Moreover, as the event-based sensor possesses spontaneous sensitivity toward the triggering of an event, an event frame generated there-by may represent events captured within a fraction of a millisecond. Thus, an event voxel may form a sparsely populated type of edge map, in which only areas that are informative for image restoration process are processed while other areas may be discarded without any computation. Therefore, the event-based sensor allows triggering of system processing only when sufficient event data are accumulated (e.g., more events may be triggered when heavy camera jittering occurs). When there is less movement in the camera device, fewer event frames would be generated (and thus less computation would be performed), thereby conserving power and processing resources.

Nevertheless, as discussed previously, depending on specific application environment and operating requirements, other types of sensor components possessing distinct respond characteristics toward an optical input may be utilized in a hybrid imaging device without departing from the spirit of the instant disclosure.

Accordingly, one aspect of the instant disclosure provides a method of image processing, which comprises: obtaining optical input from a hybrid imaging device, wherein an obtained optical input comprises a first component and a second component that temporally corresponds to the first component; wherein the first component of the obtained optical input corresponds to a first temporal resolution, while the second component of the obtained optical input corresponds to a second temporal resolution higher than that of the first component; performing image restoration operation on a first subset of the first component of the obtained optical input in accordance with data from the second component of the obtained optical input; and performing image fusion operation to generate fused image data from an output of the image restoration operation and a second subset of the first component of the obtained optical input.

Accordingly, another aspect of the instant disclosure provides an image processing system, which comprises: a hybrid imaging device configured to obtain optical input, wherein an obtained optical input comprises a first component and a second component that temporally corresponds to the first component wherein the first component corresponds to a temporal resolution that is higher than that of the second component; and a processing device in signal communication with the hybrid imaging device, the processing device comprising: an image restoration circuit configured to process a first subset of the first component of the obtained optical input in accordance with data from the second component of the obtained optical input; and an image fusion circuit configured to generate fused image data based on output of the image restoration circuit and a second subset of the first component of the obtained optical input.

Those skilled in the art will readily observe that numerous modifications and alterations of the device and method may be made while retaining the teachings of the instant disclosure. Accordingly, the above disclosure should be construed as limited only by the metes and bounds of the appended claims.

What is claimed is:

1. A method of image processing, comprising:
obtaining optical input from a hybrid imaging device,
wherein an obtained optical input comprises a first component and a second component having motion related information corresponding to the first component;
wherein the first component of the obtained optical input corresponds to a first temporal resolution, while the second component of the obtained optical input corresponds to a second temporal resolution higher than that of the first component;
performing image restoration operation on a first subset of the first component of the obtained optical input in accordance with data from the second component of the obtained optical input, wherein the first subset of the first component of the obtained optical input comprises a first exposure frame having a first exposure duration; and
performing image fusion operation to generate fused image data from an output of the image restoration operation and a second subset of the first component of the obtained optical input, wherein the second subset of the first component of the obtained optical input comprises a second exposure frame having a second exposure duration, and the second exposure duration is shorter than the first exposure duration,
wherein the first subset and the second subset of the first component of the obtained optical input temporally offset each other.

2. The method of claim 1,
wherein the first subset of the first component of the obtained optical input has a longer temporal duration than the second subset thereof.

3. The method of claim 1,
wherein the obtaining of optical input by a hybrid image system comprises acquiring optical input by a hybrid imaging device that comprises integrated first type sensor component and second type sensor component;
wherein the first component of the optical input corresponds to the first type sensor component;
wherein the second component of the optical input corresponds to the second type sensor component.

4. The method of claim 3,
wherein the first type sensor component has a first pixel resolution;
wherein the second type sensor component has a second pixel resolution less than the first pixel resolution.

5. The method of claim 3,
wherein the first type sensor component comprises frame-based image sensor; wherein the second type sensor component comprises event-based vision sensor.

6. The method of claim 1,
wherein performing image restoration operation comprises performing at least one of a de-blurring operation or a rolling shutter distortion correction (RSDC) operation on the first subset of the first component.

7. The method of claim 6,
wherein the image restoration operation is performed in accordance with a first portion of the second component of the obtained optical input that temporally corresponds to the first subset of the first component of the obtained optical input.

8. The method of claim 7, further comprising:
performing additional image restoration operation on the second subset of the first component of the obtained optical input in accordance with a second portion of the second component of the obtained optical input.

9. The method of claim 8,
wherein the additional image restoration operation comprises performing RSDC operation on the second subset of the first component of the obtained optical input.

10. The method of claim 1, further comprising:
performing temporal alignment operation on the first subset of the first component of the obtained optical input in accordance with data from the second component of the obtained optical input.

11. The method of claim 10, wherein the temporal alignment operation is performed in accordance with a first portion of the second component that temporally corresponds to the first subset of the first component of the obtained optical input.

12. The method of claim 11, wherein the temporal alignment operation is performed further in accordance with a second portion of the second component that temporally corresponds to the second subset of the first component of the obtained optical input.

13. An image processing system, comprising:
a hybrid imaging device configured to obtain optical input,
wherein an obtained optical input comprises a first component and a second component having motion related information corresponding to the first component,
wherein the second component corresponds to a temporal resolution that is higher than that of the first component; and
a processing device in signal communication with the hybrid imaging device, the processing device comprising:
an image restoration circuit configured to process a first subset of the first component of the obtained optical input in accordance with data from the second component of the obtained optical input, wherein the first subset of the first component of the obtained optical input comprises a first exposure frame having a first exposure duration; and
an image fusion circuit configured to generate fused image data based on output of the image restoration circuit and a second subset of the first component of the obtained optical input, wherein the second subset of the first component of the obtained optical input comprises a second exposure frame having a second exposure duration, and the second exposure duration is shorter than the first exposure duration, wherein the first subset and the second subset of the first component of the obtained optical input temporally offset each other.

14. The device of claim 13, wherein the hybrid imaging device comprises a first type sensor component and a second type sensor component;

wherein the first component of the optical input corresponds to the first type sensor component;

wherein the second component of the optical input corresponds to the second type sensor component.

15. The device of claim 14, wherein the image restoration circuit is configured to respectively process both the first component of the optical input from the first type sensor and the second component of the optical input from the second type sensor.

16. The device of claim 15, wherein the first type sensor component has a first pixel resolution and a first temporal resolution;

wherein the second type sensor component has a second pixel resolution less than the first pixel resolution and a second temporal resolution greater than the first temporal resolution.

17. The device of claim 16, wherein the first type sensor component comprises an array of frame-based image sensor cells; and wherein the second type sensor component comprises an array of event-based vision sensor cells interleavingly inserted among the first type sensor cells.

18. The device of claim 13, wherein the first subset of the first component of the obtained optical input has a longer temporal duration than the second subset thereof.

19. The device of claim 13, wherein the image restoration circuit is configured to perform at least one of a de-blurring operation or a rolling shutter distortion correction (RSDC) operation on the first subset of the first component.

20. The device of claim 19, wherein the image restoration circuit is configured to operate in accordance with a first portion of the second component of the obtained optical input that temporally corresponds to the first subset of the first component of the obtained optical input.

21. The device of claim 20, further comprising:

an additional image restoration circuit configured to process the second subset of the first component of the obtained optical input in accordance with a second portion of the second component of the obtained optical input.

22. The method of claim 21, wherein the additional image restoration circuit is configured to perform RSDC operation on the second subset of the first component of the obtained optical input.

23. The device of claim 13, further comprising:

a temporal alignment circuit signal communicatively arranged between the image restoration circuit and the image fusion circuit, configured to perform temporal alignment operation on the first subset of the first component of the obtained optical input in accordance with data from the second component of the obtained optical input.

24. The device of claim 23, wherein the temporal alignment circuit is further configured to perform temporal alignment operation on the second subset of the first component of the obtained optical input.

* * * * *

UNITED STATES PATENT AND TRADEMARK OFFICE
CERTIFICATE OF CORRECTION

PATENT NO. : 12,254,607 B2
APPLICATION NO. : 17/576302
DATED : March 18, 2025
INVENTOR(S) : Luis Eduardo García Capel and Bo Mu It is certified that error appears in the above-identified patent and that said Letters Patent is hereby corrected as shown below:

In the Claims

In Claim 3, Column 15, Lines 60 to 61, replace "a hybrid image system" with -- the hybrid imaging device --

In Claim 3, Column 15, Lines 61 to 62, replace "a hybrid imaging device" with -- the hybrid imaging device --

In Claim 14, Column 17, Line 7, replace "device" with -- image processing system --

In Claim 15, Column 17, Line 15, replace "device" with -- image processing system --

In Claim 16, Column 17, Line 21, replace "Claim 15" with -- Claim 14 --

In Claim 16, Column 17, Line 21, replace "device" with -- image processing system --

In Claim 17, Column 17, Line 28, replace "device" with -- image processing system --

In Claim 18, Column 17, Line 34, replace "device" with -- image processing system --

In Claim 19, Column 18, Line 1, replace "device" with -- image processing system --

In Claim 20, Column 18, Line 6, replace "device" with -- image processing system --

In Claim 21, Column 18, Line 12, replace "device" with -- image processing system --

In Claim 22, Column 18, Line 18, replace "method" with -- image processing system --

Signed and Sealed this
Eighth Day of July, 2025

Coke Morgan Stewart
*Acting Director of the United States Patent and Trademark Office*

CERTIFICATE OF CORRECTION (continued)
U.S. Pat. No. 12,254,607 B2

In Claim 23, Column 18, Line 23, replace "device" with -- image processing system --

In Claim 24, Column 18, Line 31, replace "device" with -- image processing system --